United States Patent
Kapczynski et al.

(10) Patent No.: US 6,938,874 B2
(45) Date of Patent: Sep. 6, 2005

(54) SPANNER FOR A BALL VALVE

(75) Inventors: Przemyslaw Kapczynski, Poznan (PL);
Marek Wroblewski, Rawicz (PL);
Marian Wlodarczyk, Rawicz (PL)

(73) Assignee: Zaklad Urzadzen Gazowniczych "Gazomet", Rawicz. (PL)

( * ) Notice: Subject to any disclaimer, the term of this patent is extended or adjusted under 35 U.S.C. 154(b) by 177 days.

(21) Appl. No.: 10/312,152

(22) PCT Filed: Dec. 27, 2000

(86) PCT No.: PCT/PL00/00106

§ 371 (c)(1),
(2), (4) Date: Dec. 19, 2002

(87) PCT Pub. No.: WO01/98698

PCT Pub. Date: Dec. 27, 2001

(65) Prior Publication Data

US 2003/0136933 A1 Jul. 24, 2003

(30) Foreign Application Priority Data

Jun. 21, 2000 (PL) ................................. 340974

(51) Int. Cl.[7] ................................. F16K 5/06
(52) U.S. Cl. ..................... 251/110; 251/207
(58) Field of Search .............. 251/90, 92, 93, 251/95, 96, 97, 102, 106, 110, 206, 207

(56) References Cited

U.S. PATENT DOCUMENTS

| | | | | |
|---|---|---|---|---|
| 3,148,553 A | * | 9/1964 | Carr | 251/230 |
| 3,648,970 A | * | 3/1972 | Hartmann et al. | 251/110 |
| 3,679,170 A | * | 7/1972 | Bernas et al. | 251/110 |
| 4,203,572 A | * | 5/1980 | Coffman | 251/95 |
| 5,183,073 A | * | 2/1993 | Roberts | 251/110 |
| 5,213,308 A | * | 5/1993 | Jeromson et al. | 251/106 |
| 5,285,997 A | * | 2/1994 | Chang | 251/110 |
| 5,772,177 A | * | 6/1998 | Holloway et al. | 251/110 |
| 5,944,051 A | * | 8/1999 | Johnson | 251/207 |

* cited by examiner

*Primary Examiner*—Eric Keasel
(74) *Attorney, Agent, or Firm*—Jordan and Hamburg LLP

(57) ABSTRACT

A ball valve has a body, a stem engaging a ball closing component having a main flow hole and auxiliary flow holes, and a spanner having shaft body and a handle. The shaft body has a base with a seating hole and a latch with an elastic pressure element located slidably in the base. In the body there is a recess which accepts an end of the latch to retain the spanner in a position where flow is effected through the auxiliary flow holes and not the main flow hole. The shaft body is connected with the stem by a screw. A handle is connected to an upper end of the shaft body.

22 Claims, 4 Drawing Sheets

A-A

SPANNER FOR A BALL VALVE

BACKGROUND

This invention relates to a ball valve and to a spanner for the ball valve.

A known ball valve has a valve body, a ball closing component, and a valve stem and it is equipped with seal rings mounted to the stem grooves. The ball closing component has a main passage hole which enables flow of an operating medium and, in addition, has passage openings located axially opposite the main hole. There is a rotation limiter, working together with a resistance flange mounted into the body inside the limiter, located on an end of a stem extending outside the body. There is a separate spanner, which is used for opening and closing the above mentioned valve, which, when the valve is used, is installed on the end of the stem. The spanner has a shaft body which has a seating hole and a handle connected firmly to the shaft body.

Construction of the above mentioned valve enables gradual growth of pressure in a gas piping during opening it and a slow fall of pressure while closing because additional holes used and placed in the ball closing component case operating medium flow first through the additional holes and later on through the main hole of the closing component during opening of the valve. But during closing of the valve, after covering the main hole in the closing component, additional holes are opened for a certain time and later on the valve is completely closed. But the spanner used for opening and closing of the ball valve enables effective service of the valve only within the range of two extreme positions e.g. completely opened and completely closed. But it is not adapted to operating the valve in stages of opening where phases of equalization of pressures are taken into account.

SUMMARY OF THE INVENTION

A ball valve according to present invention has a valve body assembly, a stem, and a ball closing component having a main hole and additional passage holes opposite the main hole and it is equipped with closing component seals and stem seals. Further provided is a spanner, which is an integral part of the valve. The spanner is constructed of a handle and a shaft body having a base with a seating hole in a shape corresponding to a shape of an end of the stem extending out of the valve body. The base is equipped with a latch with an elastic pressure element in hole of the base. There is a recess in the valve body, advantageously in a shape of a bean opened at a side of the shaft body of the spanner. A latch end mates with the above mentioned recess. The spanner is connected with the stem by a screw screwed into the stem axially. A first embodiment involves a ball valve equipped with a rotation limiter, wherein the spanner is mounted with its base on the stem and against the rotation limiter. In this variety, the end of the latch, at the side of the valve body, is constantly in a passage hole which is situated in the rotation limiter and is temporarily in the recess of the valve body in the range between closed and open positions of the valve.

A second embodiment has a ball valve without the rotation limiter, the spanner is mounted with the base of the shaft body on the end of the stem extending out of the body and against a top surface of the valve body. In this case, the end of the latch, from the side of the valve body is placed constantly in a recess of the body. The recess is in an angular field between two rays placed to each other at a right angle.

The ends of the recess determine positions of closing and opening of the valve, moreover the recess, on the section corresponding to the range between closed and partly open position of the valve, is deeper than the rest of the recess forming a recess within a recess.

The spanner for the ball valve further has a handle and an elastic pressure element, which is placed in a hole of the base of the shaft body for biasing the latch.

The latch has the form of a pin element having a seating end on one ending and flange placed nearby and a handle on a second end.

The ball valve with the spanner, being its integral part which cooperates with a closing component enables two stage valve opening e.g. the proper use of the closing component function with equalization of pressures. Construction of the spanner guarantees reliable and simple operation of the valve and, what is the most important, the proper positioning of the ball closing component, which enables preflow first with gradual coming into main flow.

BRIEF DESCRIPTION OF THE DRAWINGS

The object of the invention is represented by the drawings of which.

DETAILED DESCRIPTION

Figure 1:
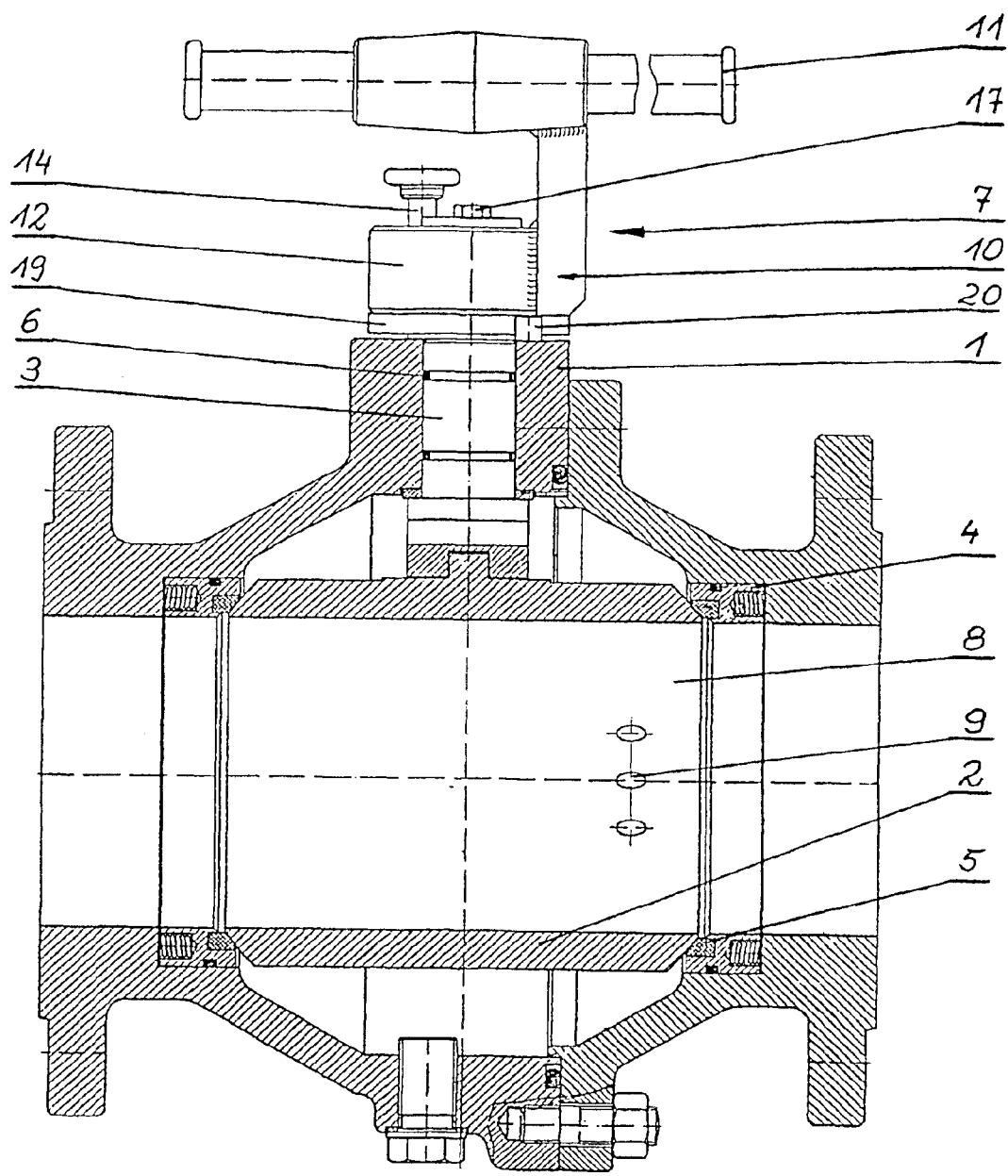
FIG. 1 is a side elevation cross-sectional view of a ball valve and spanner of a first embodiment of the present invention.

A ball valve, according to the present invention has a valve body 1, a ball closing component 2, and a stem 3 for rotation of the closing component 2 and is equipped with seating rings 4 with seals 5 incorporated into the valve body 1 inside the ball closing component 2, with seal rings 6 mounted in grooves of the stem 3 and with a spanner 7 for opening and closing of the ball valve. The ball closing component 2 has a main passage hole 8 enabling flow of gas and additional, or auxiliary passage holes 9 placed in one axis, opposite sides of the main hole 8.

The spanner 7, which is an integral part of the valve, is composed of a shaft body 10 and a handle 11. The shaft body 10 contains a base 12 which has a seating hole 13 in a shape complying with a shape of an ending of the stem 3 extending outside the valve body 1 and a latch pin 14 with an elastic pressure element 15 biasing the latch pin 14 into a hole 16 of the base 12.

The spanner 7 is connected with the stem 3 by means of a screw 17 screwed axially in the stem 3.

In the valve body 1 there is a recess 18 in a shape of a bean, open at a side of the shaft body 10 of the spanner 7.

Figure 2:
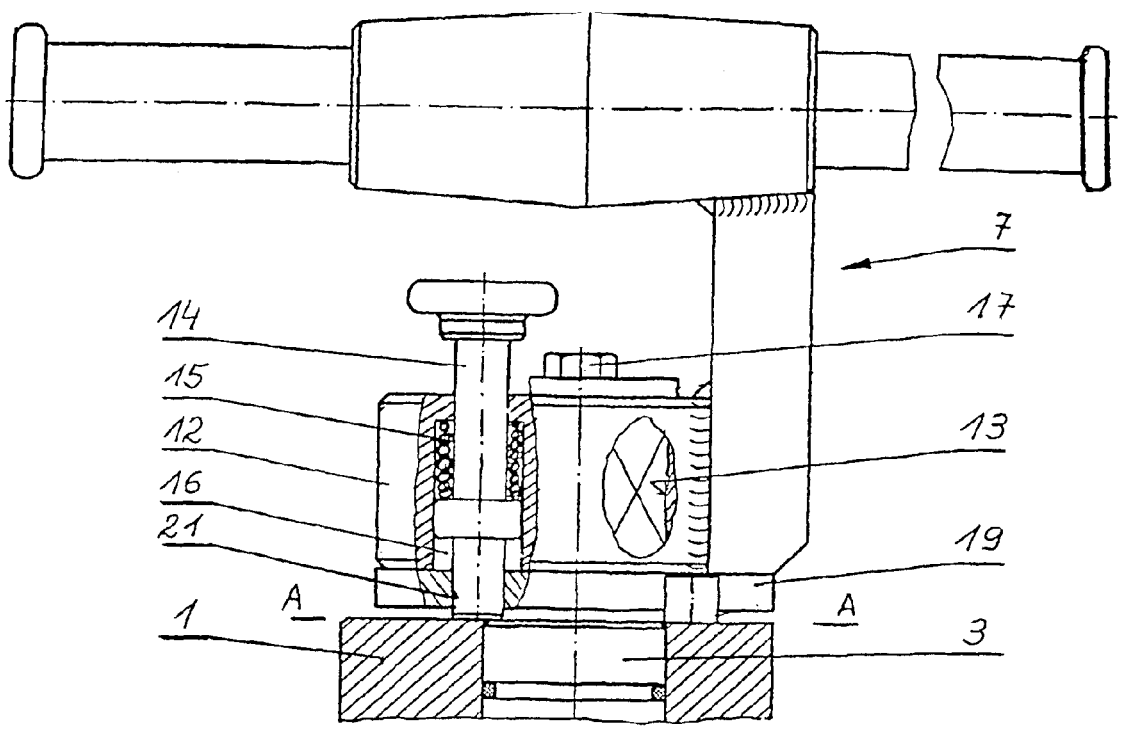
FIG. 2 is a side elevation partial cross-section view of the spanner mounting for the ball valve of the first embodiment having a rotation limiter.
Figure 3:
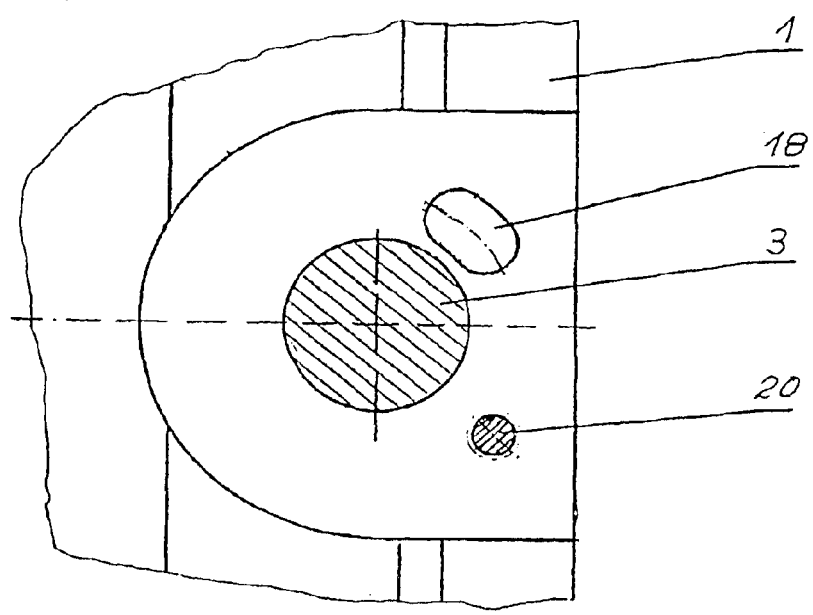
FIG. 3 is a top plan view of a fragment of the valve taken along section A—A of FIG. 2.

In a first embodiment shown in FIG. 2 in which a ball valve is equipped with a rotation limiter 19 and a resistance pin 20 placed in the valve body 1, the spanner 7 is mounted with its base 12 on an end of the stem 3 and connected with the rotation limiter 19. The end of the latch pin 14, extends from the base into a passage hole 21 which is situated in the rotation limiter 19 and temporarily in a recess 18 of the valve body 1, in a range between closed and partly opened positions of the valve. The recess 18 is disposed in the valve body 1 in such a way that it doesn't allow for further opening of the valve after advancing the ball closing component 2 to the position where the additional passage holes 9 are completely uncovered and the main hole 8 is still covered.

Figure 4:
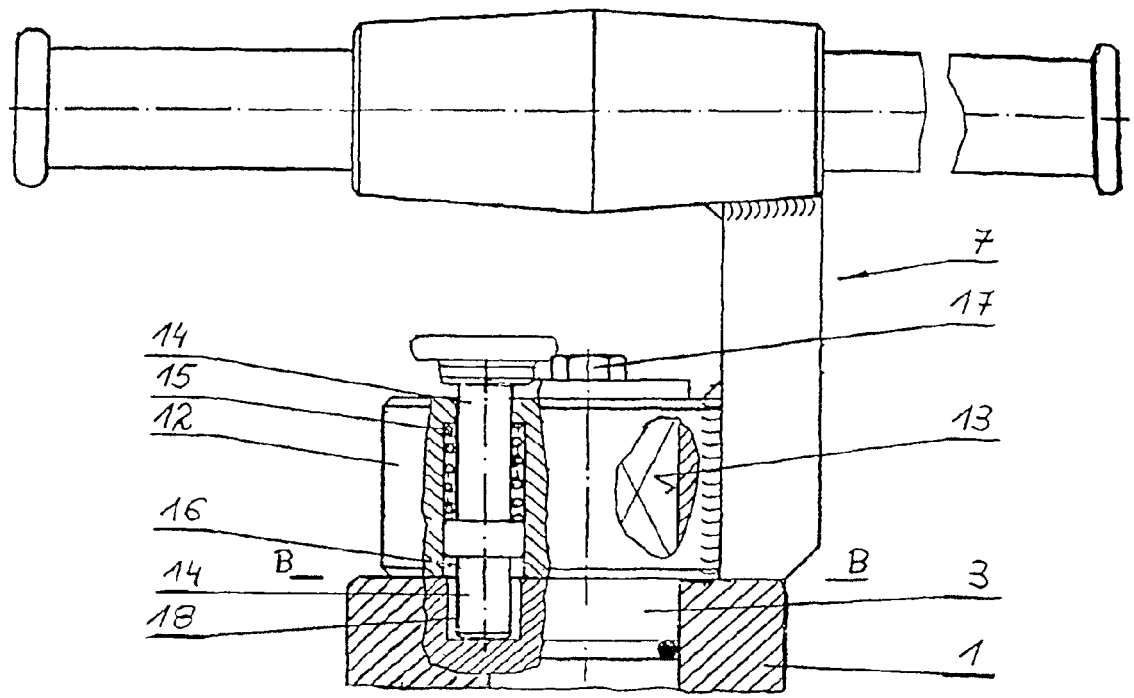
FIG. 4 is a side elevation cross-sectional view of a spanner mounting for the ball valve of a second embodiment without a rotation limiter.
Figure 5:
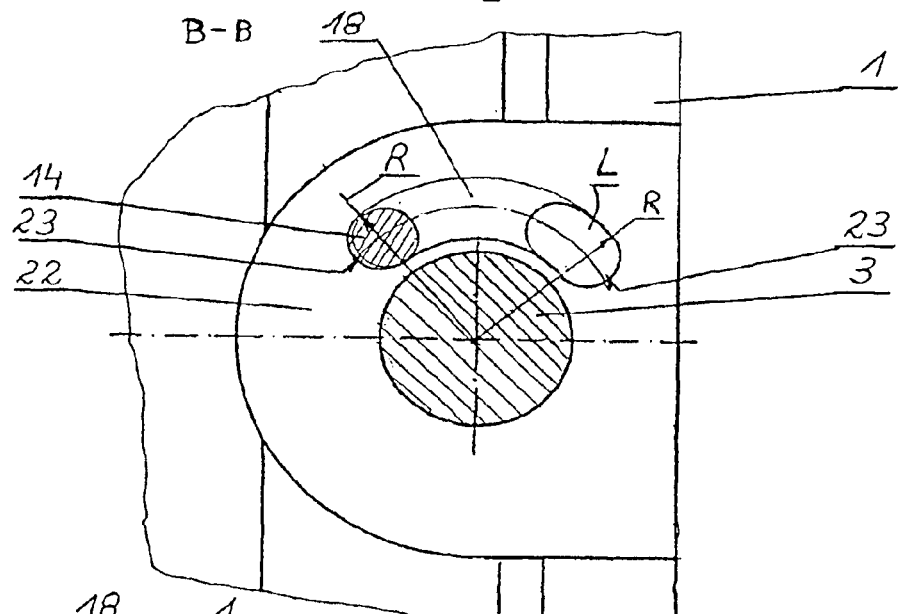
FIG. 5 is a top plan view of a fragment of the valve taken along section B—B of FIG. 4.
Figure 6:
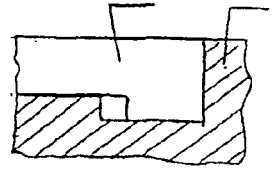
FIG. 6 is side elevation fragment view of a valve body having a recess as shown in FIG. 5.
Figure 7:
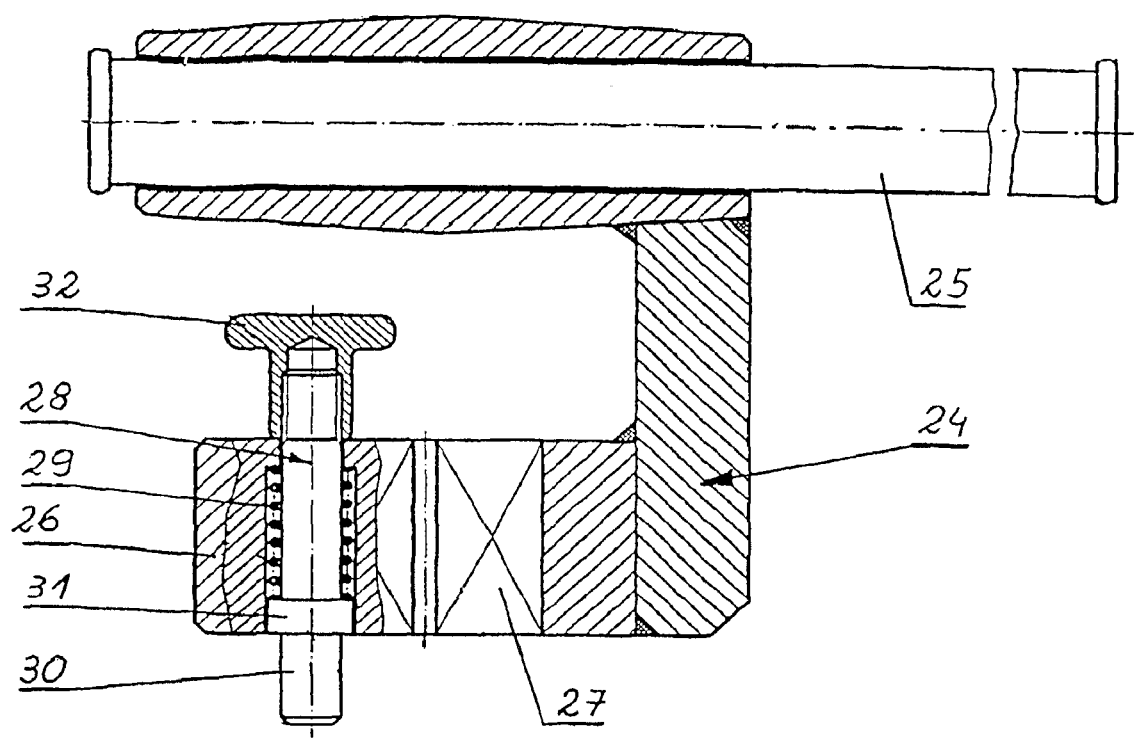
FIG. 7 is a side elevation cross-sectional view of a shaft body of the spanner.

In a second embodiment shown in FIG. 4 concerning a ball valve without a rotation limiter, the spanner 7 is mounted with the base 12 of the shaft body 10 on the end of the stem 3 extending from the body 1 and adjacent surface 22 of the body 1. The end of the latch pin 14 is biased constantly in a recess 18 of the valve body 1.

The recess 18 is in a range field between two rays R which are placed at a right angle to each other. The resistance ends 23 of the recess 18 determine extreme positions e.g. closing and opening of the valve. The recess 18, on the segment L, corresponding to the range between closed and partly opened positions of the valve, is deeper than the rest of the recess. Opening of the ball valve is in two phases—in the first phase until full opening of gas flow through additional holes 9 in ball closing component 2 equalizes pressures in front of and behind the valve, and in the second phase, after lifting the latch pin 14, to full opening of main flow.

In the first embodiment of the valve, the latch pin 14 is placed in the recess 18 of the body 1 only in the first phase and farther it relocates, along the body 1, but in the second embodiment it is placed in the recess 18 for the whole time of opening and closing of the valve.

The valve is closed by continuous movement until achieving extreme position e.g. complete closing of gas flow.

The ball valve is used especially in reduction-measurement gas stations.

The spanner for the ball valve, according to the invention is made of the shaft body 24 and a handle 25. The shaft body 24 contains the base 26 with a seating hole 27 and a latch pin 28 with an elastic pressure element 29 placed in the base 26.

The latch 28 has a shape of a pin element having a seating end 30 on its one end and a flange 31 placed nearby and a hand grip 32 on second end.

The handle 25 is fixed in the shaft body 24.

What is claimed is:

1. A valve device, comprising:
   a valve body assembly defining a valve component cavity and inlet and outlet openings communicating with said valve component cavity, and having a top surface with a stem hole and a recess defined therein;
   a valve component movably disposed in said valve component cavity and having a main flow passage communicating flow between said inlet and outlet openings when said valve component is in a first position, at least one auxiliary flow passage communicating flow between said inlet and outlet openings at a lesser rate than said main flow passage when said valve component is in a second position, and said valve component stopping flow between said inlet and outlet openings when said valve component is in a third position;
   a stem rotatably mounted in said stem hole in said valve body assembly and extending from said top surface, said stem engaging said valve component to effect rotation of the valve component between said first, second and third positions;
   a spanner having a shaft body with a base connected to said stem for permit rotation of said stem via said spanner, said base having a bottom surface opposing said top surface of said valve body assembly; and
   said base having a latch member movably disposed and biased to extend from said bottom surface of said base and move between a latched position disposed within said recess to which said latch member is biased and an unlatched position clear of said recess, wherein said latch member and said recess are relatively disposed and configured such that when said latch member is in said latched position said valve component is disposable from said second to said third positions and is restricted from movement outside of a range from said second to third positions.

2. The valve device of claim 1 further comprising a rotation limiter plate disposed between said bottom surface of said base and said top surface of said valve body assembly, said rotation limiter having an aperture through which said latch member passes to engage said recess.

3. The valve device of claim 2 further comprising a biasing body biasing said latch member into said latched position.

4. The valve device of claim 3 wherein said recess is arc shaped subtending an angle sufficient to encompass movement of said latch member therein during rotation of said valve component from said second position to said third position.

5. The valve device of claim 4 wherein said latch member is slidably disposed in said base.

6. The valve device of claim 5 wherein said latch member is a pin slidably disposed in said base, said pin having a pin end disposable in said recess, a handle end extending from a top surface of said based, and a flange between said handle end and said pin end engaged by said biasing body.

7. The valve device of claim 6 wherein said recess is a first recess and said top surface of said valve body assembly defines a second recess encompassing said first recess, said second recess having a depth less than said first recess, said latch member engaging said second recess and not said first recess when in said unlatched position, and said latch member and said second recess are relatively disposed and configured such that when said latch member is in said unlatched position said valve component is disposable from said first to said second position and from said second to said third positions and is restricted from movement outside of a range from said first to third positions.

8. The valve device of claim 7 wherein said first recess has a closed perimeter defining a bean shape.

9. The valve device of claim 1 further comprising a biasing body biasing said latch member into said latched position.

10. The valve device of claim 9 wherein said recess is arc shaped subtending an angle sufficient to encompass movement of said latch member therein during rotation of said valve component from said second position to said third position.

11. The valve device of claim 10 wherein said latch member is slidably disposed in said base.

12. The valve device of claim 11 wherein said latch member is a pin slidably disposed in said base, said pin having a pin end disposable in said recess, a handle end extending from a top surface of said based, and a flange between said handle end and said pin end engaged by said biasing body.

13. The valve device of claim 12 wherein said recess is a first recess and said top surface of said valve body assembly defines a second recess encompassing said first recess, said second recess having a depth less than said first recess, said latch member engaging said second recess and not said first recess when in said unlatched position, and said latch member and said second recess are relatively disposed and configured such that when said latch member is in said unlatched position said valve component is disposable from said first to said second position and from said second to said third positions and is restricted from movement outside of a range from said first to third positions.

14. The valve device of claim 13 wherein said first recess has a closed perimeter defining a bean shape.

15. The valve device of claim 1 wherein said recess is arc shaped subtending an angle sufficient to encompass movement of said latch member therein during rotation of said valve component from said second position to said third position.

16. The valve device of claim 15 wherein said latch member is slidably disposed in said base.

17. The valve device of claim 16 wherein said latch member is a pin slidably disposed in said base, said pin having a pin end disposable in said recess, a handle end extending from a top surface of said based, and a flange between said handle end and said pin end engaged by a biasing body biasing said latch member.

18. The valve device of claim 17 wherein said recess has a closed perimeter defining a bean shape.

19. The valve device of claim 1 wherein said latch member is slidably disposed in said base.

20. The valve device of claim 19 wherein said latch member is a pin slidably disposed in said base, said pin having a pin end disposable in said recess, a handle end extending from a top surface of said based, and a flange between said handle end and said pin end engaged by a biasing body biasing said latch member.

21. The valve device of claim 20 wherein said recess has a closed perimeter defining a bean shape.

22. The valve device of claim 1 wherein said recess has a closed perimeter defining a bean shape.

* * * * *